United States Patent
Daum et al.

(10) Patent No.: US 10,384,264 B2
(45) Date of Patent: Aug. 20, 2019

(54) COMPACT AXIALLY TRANSLATIONAL POWDER DEPOSITION HEAD

(71) Applicant: Rolls-Royce Corporation, Indianapolis, IN (US)

(72) Inventors: Peter E. Daum, Fishers, IN (US); Scott Greene, Edgewood, NM (US)

(73) Assignee: Rolls-Royce Corporation, Indianapolis, IN (US)

( * ) Notice: Subject to any disclaimer, the term of this patent is extended or adjusted under 35 U.S.C. 154(b) by 687 days.

(21) Appl. No.: 14/997,118

(22) Filed: Jan. 15, 2016

(65) Prior Publication Data

US 2016/0207108 A1  Jul. 21, 2016

Related U.S. Application Data

(60) Provisional application No. 62/104,446, filed on Jan. 16, 2015.

(51) Int. Cl.
*B29C 67/00* (2017.01)
*B22F 3/105* (2006.01)
(Continued)

(52) U.S. Cl.
CPC ............ *B22F 3/1055* (2013.01); *B28B 1/001* (2013.01); *B29C 64/153* (2017.08); *B29C 64/20* (2017.08);
(Continued)

(58) Field of Classification Search
CPC ..... B29C 45/00; B29C 45/17; B29C 45/1734; B29C 45/1737; B29C 64/00; B29C 64/20; B29C 64/209; B29C 64/232
See application file for complete search history.

(56) References Cited

U.S. PATENT DOCUMENTS 4,724,299 A   2/1988   Hammeke
5,111,021 A   5/1992   Jolys et al.
(Continued)

FOREIGN PATENT DOCUMENTS

DE      10120725 C1     12/2002
DE   102005058172 A1    11/2006
(Continued)

OTHER PUBLICATIONS

Extended European Search Report from counterpart European Application No. 16151507.7, dated Jun. 10, 2016, 6 pp.
(Continued)

*Primary Examiner* — Joseph S Del Sole
*Assistant Examiner* — Thu Khanh T Nguyen
(74) *Attorney, Agent, or Firm* — Shumaker & Sieffert, P.A.

(57) ABSTRACT

A material deposition head may include a ring configured to rotate about a first body portion and cause axial translation of the first body portion relative to a second body portion, where one or more nozzles are coupled to the first body portion. In some examples, at least one anti-rotation pin may substantially prevent rotation of the first body portion while the first body portion axially translates, and a seal may substantially prevent external contaminants from invading an interior portion of the material deposition head. In addition, a pointer tool attached to the head and an external translational measurement tool may permit measurement of an axial position of the one or more nozzles without requiring disassembly of the head or disruption of a substantially inert environment within which additive manufacturing may proceed. A method of axially translating the first body portion of the head also is disclosed.

20 Claims, 9 Drawing Sheets

(51) Int. Cl.
  *B33Y 30/00* (2015.01)
  *B28B 1/00* (2006.01)
  *B29C 64/153* (2017.01)
  *B29C 64/20* (2017.01)
  *B29C 64/209* (2017.01)
  *B33Y 10/00* (2015.01)
  *B29K 105/00* (2006.01)

(52) U.S. Cl.
  CPC ............ *B29C 64/209* (2017.08); *B33Y 30/00* (2014.12); *B22F 2003/1056* (2013.01); *B29K 2105/251* (2013.01); *B33Y 10/00* (2014.12); *Y02P 10/295* (2015.11)

(56) References Cited

U.S. PATENT DOCUMENTS

| | | | |
|---|---|---|---|
| 5,321,228 A | 6/1994 | Krause et al. | |
| 5,531,581 A * | 7/1996 | Donnell, Jr. | B29C 44/60 425/145 |
| 5,961,862 A | 10/1999 | Lewis et al. | |
| 6,046,426 A | 4/2000 | Jeantette et al. | |
| 6,423,926 B1 | 7/2002 | Kelly | |
| 6,429,402 B1 | 8/2002 | Dixon et al. | |
| 6,534,745 B1 | 3/2003 | Lowney | |
| 6,696,664 B2 | 2/2004 | Pyritz et al. | |
| 6,756,561 B2 | 6/2004 | McGregor et al. | |
| 6,774,338 B2 | 8/2004 | Baker et al. | |
| 6,894,247 B2 | 5/2005 | Renteria et al. | |
| 7,259,353 B2 | 8/2007 | Guo | |
| 7,765,022 B2 | 7/2010 | Mazumder et al. | |
| 8,097,825 B2 | 1/2012 | Sato et al. | |
| 8,735,769 B2 | 5/2014 | Miyagi et al. | |
| 2002/0051853 A1 | 5/2002 | Keicher et al. | |
| 2002/0166846 A1 | 11/2002 | Pyritz et al. | |
| 2003/0116542 A1 | 6/2003 | McGregor et al. | |
| 2003/0213786 A1 | 11/2003 | Baker et al. | |
| 2004/0016726 A1 | 1/2004 | Renteria et al. | |
| 2005/0056628 A1 | 3/2005 | Hu | |
| 2006/0065650 A1 | 3/2006 | Guo | |
| 2009/0230099 A1 | 9/2009 | Aalto et al. | |
| 2011/0259858 A1 | 10/2011 | Wappler et al. | |
| 2012/0261393 A1 | 10/2012 | Nowotny et al. | |

FOREIGN PATENT DOCUMENTS

| | | |
|---|---|---|
| EP | 1825948 A2 | 8/2007 |
| EP | 2314411 A2 | 4/2011 |
| GB | 2440727 | 2/2008 |
| JP | 6049886 | 3/1985 |
| WO | 2007022567 A1 | 3/2007 |

OTHER PUBLICATIONS

Notice of Intent to Grant and Text Intended to Grant from counterpart European Application No. 16151507.7, dated Sep. 6, 2017, 7 pp.

Response to Extended Search Report dated Jun. 10, 2016, from counterpart European Application No. 16151507.7, filed Dec. 22, 2016, 6 pp.

\* cited by examiner

COMPACT AXIALLY TRANSLATIONAL POWDER DEPOSITION HEAD

This application claims the benefit of U.S. Provisional Patent Application No. 62/104,446 filed Jan. 16, 2015, which is incorporated herein by reference in its entirety.

TECHNICAL FIELD

The present disclosure describes a head for use in additive manufacturing.

BACKGROUND

Additive manufacturing generates three-dimensional structures through addition of material layer-by-layer or volume-by-volume to form the structures, rather than removing material from an existing component to generate three-dimensional structures. Additive manufacturing may be advantageous in certain circumstances, such as rapid prototyping, repair, forming components with complex three-dimensional structures, or the like. In some examples, the additive manufacturing process may utilize a laser to melt or sinter together powdered materials in predetermined shapes to form the three-dimensional structures.

SUMMARY

The present disclosure is directed to a material deposition head used in an additive manufacturing process, which includes one or more nozzles carried by an axially translatable body portion. The axially translatable body portion may be axially translatable relative to another body portion. In some examples, the axially translatable body portion may be a first body portion that defines a major (e.g., long) axis and the other body portion may be a second body portion that defines a major (e.g., long) axis. The major axes of the first and second body portions may be coincident (e.g., coaxial). For example, to axially translate the first body portion relative to the second body portion, a ring may be rotated about the first body portion, in screwed engagement with the first body portion. As the first body portion axially translates, a position at which material is delivered by one or more nozzles may axially translate along the axes of the first and second body portions. An energy beam may be substantially aligned with the axes of the first and second body portions, such that axial translation of the first body portion may cause the position at which material is delivered by the one or more nozzles to axially translate along a laser beam passing through the material deposition head. In this way, the location of material delivery may be changed relative to a focal spot of the laser beam. In some examples, the material deposition head may include at least one anti-rotation pin coupled to the second body portion that engages the first body portion to substantially prevent (e.g., prevent or nearly prevent) rotation of the first body portion (about the major axis) relative to the second body portion during axial translation. In carrying out the additive manufacturing process, a material deposition head including these features may enable, for example, more precise and efficient alignment of the location at which material is delivered into a laser beam or adjacent to a substrate, as compared to material deposition heads not including these features.

In some examples, a material deposition head may include a first body portion that includes a first end, a second end, and an exterior surface extending from the first end to the second end, where at least a portion of the exterior surface includes threading. The material deposition head also may include a ring that includes a first end, a second end, and an interior surface extending from the first end of the ring to the second end of the ring, where the ring encircles the first body portion, at least a portion of the interior surface comprises threading, and the threading of the interior surface of the ring engages the threading of the exterior surface of the first body portion. Such a material deposition head may further include a second body portion, and at least one pin coupled to the second body portion that engages the first body portion to substantially prevent relative rotation between the first body portion and the second body portion, where the first body portion moves axially relative to the second body portion when the ring is rotated about the first body portion.

In some examples, this disclosure is directed to a system that includes a material deposition head that includes a first body portion including a first end, a second end, an exterior surface extending from the first end to the second end of the first body portion, and an interior surface that defines an internal passage extending from the first end to the second end of the first body portion, where the internal passage is configured to permit passage of an energy beam therethrough, and where at least a portion of the exterior surface of the first body portion includes threading. The material deposition head of such a system also may include a ring including a first end, a second end, and an interior surface extending from the first end to the second end, where at least a portion of the interior surface of the ring comprises threading, where the ring is configured to encircle and rotate about the first body portion, and where the first body portion is configured to move axially relative to a second body portion when the ring rotates about the first body portion. The material deposition head of the example system further may include the second body portion, and at least one pin coupled to the second body portion that is configured to engage the first body portion to substantially prevent relative rotation between the first body portion and the second body portion, along with one or more nozzles configured to be coupled to the first body portion proximate to the second end of the first body portion, where the first body portion further defines at least one material delivery channel that fluidically couples the one or more nozzles to a fluidized powder source. This example system also includes the fluidized powder source fluidically connected to the at least one material delivery channel, where the one or more nozzles are configured to deliver a fluidized powder from the fluidized powder source to a focal point or region adjacent to a substrate, and an energy source coupled to the internal passage defined by the first body portion.

This disclosure is also directed to a method including axially translating a first body portion of a material deposition head relative to a second body portion of the material deposition head by rotating a ring of the material deposition head, where the ring includes threads threadedly engaged with threads of the first body portion, and where at least one pin coupled to the second body portion engages the second body portion and substantially prevents rotation of the first body portion relative to the second body portion during axial translation of the first body portion. In accordance with this example, the material deposition head includes the first body portion, the first body portion including a first end, a second end, and the exterior surface extending from the first end to the second end, where at least a portion of the exterior surface includes threading. The material deposition head of this example method also includes the ring that includes a first end, a second end, and an interior surface extending from the first end to the second end, where the ring encircles the first body portion, and where at least a portion of the interior surface includes threading. The material deposition head of the example method further includes the second body portion, and one or more nozzles coupled to the first body portion proximate to the second end of the first body portion.

The details of one or more examples are set forth in the accompanying drawings and the description below. Other features, objects, and advantages will be apparent from the description and drawings, and from the claims.

DETAILED DESCRIPTION

Figure 1:
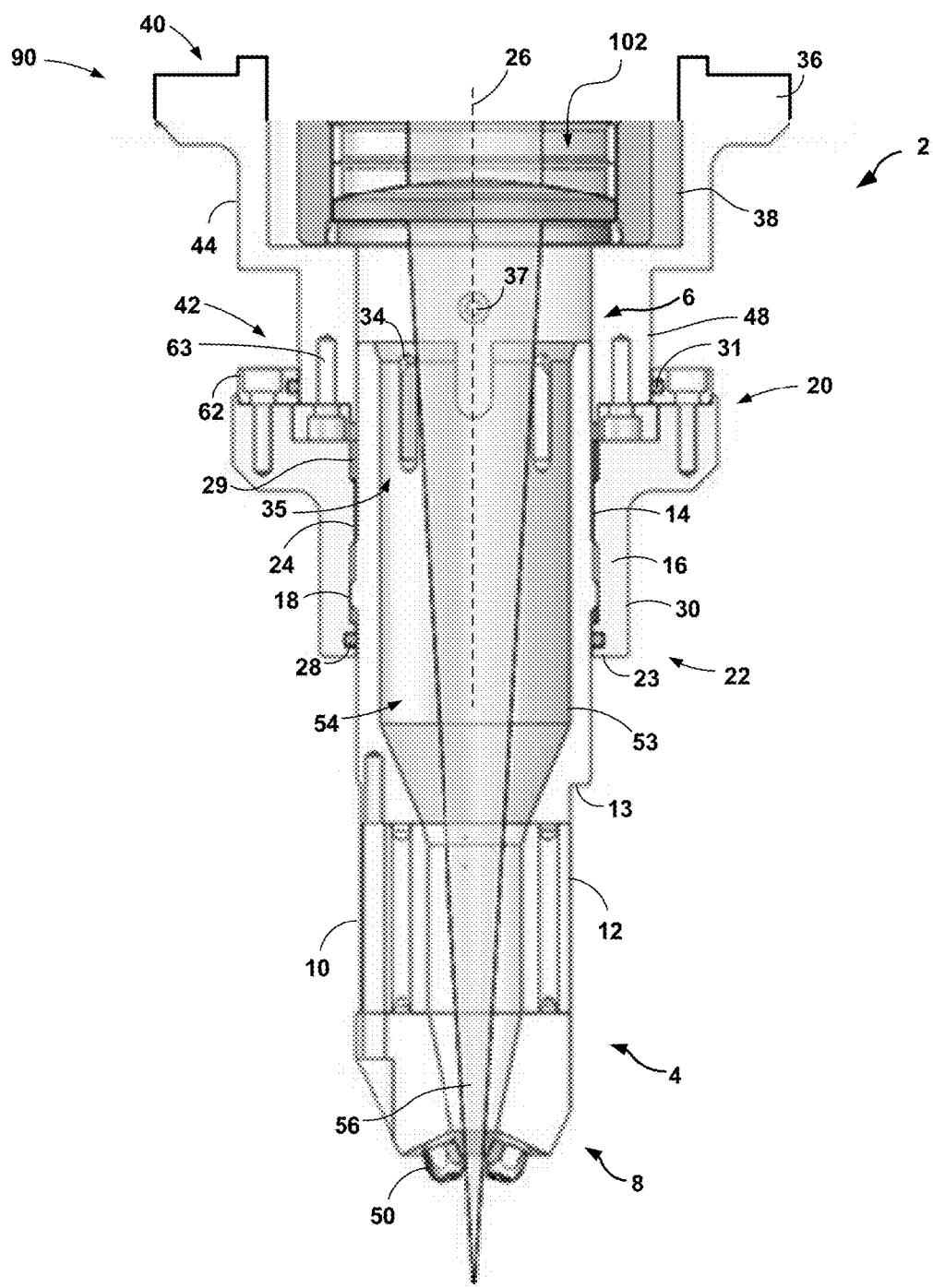
FIG. 1 is a conceptual diagram illustrating a radial cross-section of an example material deposition head including a first body portion that is axially translatable relative to a second body portion.

The present disclosure is directed to a material deposition head used in an additive manufacturing process, which includes one or more nozzles carried by an axially translatable body portion. During additive manufacturing, a component is built by adding material to the component in sequential layers. The final component includes a plurality of layers of material. In some additive manufacturing techniques, a powder may be delivered to a substrate or surface of a previously formed layer using a carrier gas. An energy beam, such as a laser beam, may be directed at predetermined volumes of the delivered powder to heat the powder. The heating of the powder, substrate or previously formed layer may, in some examples, cause the powder to sinter or melt, thereby joining material to a substrate or previously formed layer.

In some examples of this disclosure, at least one nozzle coupled to a first body portion of a material deposition head may be arranged so that a location at which material is delivered by the at least one nozzle falls in the path of an energy beam. The first body portion and nozzle may, for example, be axially translated relative to a second body portion of the material deposition head by rotating a ring that rotates in screwed engagement with the first body portion. As the first body portion and at least one nozzle axially translate, a location at which the material is delivered by the nozzle may likewise axially translate along the length of the energy beam. Further, in some examples, at least one anti-rotation pin may substantially prevent (e.g., prevent or nearly prevent) rotation of the first body portion relative to the second body portion, which may allow for more precise translation of a powder delivery location along the energy beam. For example, the at least one anti-rotation pin that is affixed to and extends downwardly from the second body portion may be received in a slot formed in the first body portion to prevent rotation of the first body portion relative to the second body portion, yet permit axial translation of the first body portion.

In some examples, the material deposition head also may include one or more seals disposed between components of the material deposition head to substantially prevent (e.g., prevent or nearly prevent) contamination of an interior portion of the material deposition head from the external environment. For instance, one or more seals disposed between the ring and the first body portion of the material deposition head may substantially prevent external gases, liquids, or solids from contaminating internal threading disposed on components of the head. The described one or more seals also may protect the purity of an inert gas stream flowed through an internal passage in the material deposition head during the additive manufacturing process.

A material deposition head including these features may enable, for example, the location at which a material is delivered by the at least one nozzle to be precisely and repeatedly axially translated along a desired range of laser beam spot sizes, with a maintained radial spatial relation between the at least one nozzle and laser beam. Such features may allow for enhanced control of the deposition of a material, as compared to material deposition heads not including axially translatable nozzles, anti-rotation pins, and/or one or more seals. For example, nozzles may be axially translated so that a largest radial cross-section (e.g., a diameter) of a location at which material is delivered by the nozzles substantially matches a radial cross-section (or spot size or diameter) of a focal spot of a laser beam, allowing for efficient use of the material.

Further, in some examples, powder capture (e.g., an amount of powder captured by an energy beam and deposited on a substrate or part) and the desired laser beam spot size may be selected based on, e.g., the dimensions, consistency, or temperature of molten material being deposited on a substrate or part. Control of such parameters of the deposition of material may be achieved in the described examples without the need to disassemble the head (which may, e.g., misalign nozzles with respect to a laser), translate optical components associated with a material deposition head (such as a position of a focused laser beam), contaminate lenses that focus an energy beam (e.g., with extraneous material that has been deflected into the surrounding environment), or break a controlled, substantially inert environment in which the additive manufacturing process may be performed. In some examples, it can take many hours (e.g., up to a day) to purge a controlled environment to achieve a level of purity sufficient for the additive manufacturing process.

In some examples, an axial position of at least one nozzle of a material deposition head may be verified without the need to disassemble the material deposition head. For example, a pointer tool may indicate the rotational position of a ring, which corresponds to an axial position of the at least one nozzle. As another example, an external tool may measure the axial position of the at least one nozzle, as described in greater detail below.

Moreover, example material deposition heads of this disclosure also may be compact in design, allowing working access to narrow spaces and for complex geometries in parts being constructed or repaired, such as adjacent blades of a blisk (a combined blade and disk, e.g., for a gas turbine engine). For example, an external surface of an otherwise substantially cylindrical material deposition head may include planar portions to reduce the profile and volume of that portion of the material deposition head.

FIG. 1 is a conceptual diagram illustrating a radial cross-section of an example material deposition head including a first body portion that is axially translatable relative to a second body portion. Certain features of the example material deposition head of FIG. 1 are described in reference to FIGS. 2-7. As shown in FIG. 1, an example material deposition head 2 includes a first body portion 4 including a first end 6 and a second end 8. An exterior surface 10 of first body portion 4 may extend from first end 6 to second end 8.

Figure 4:
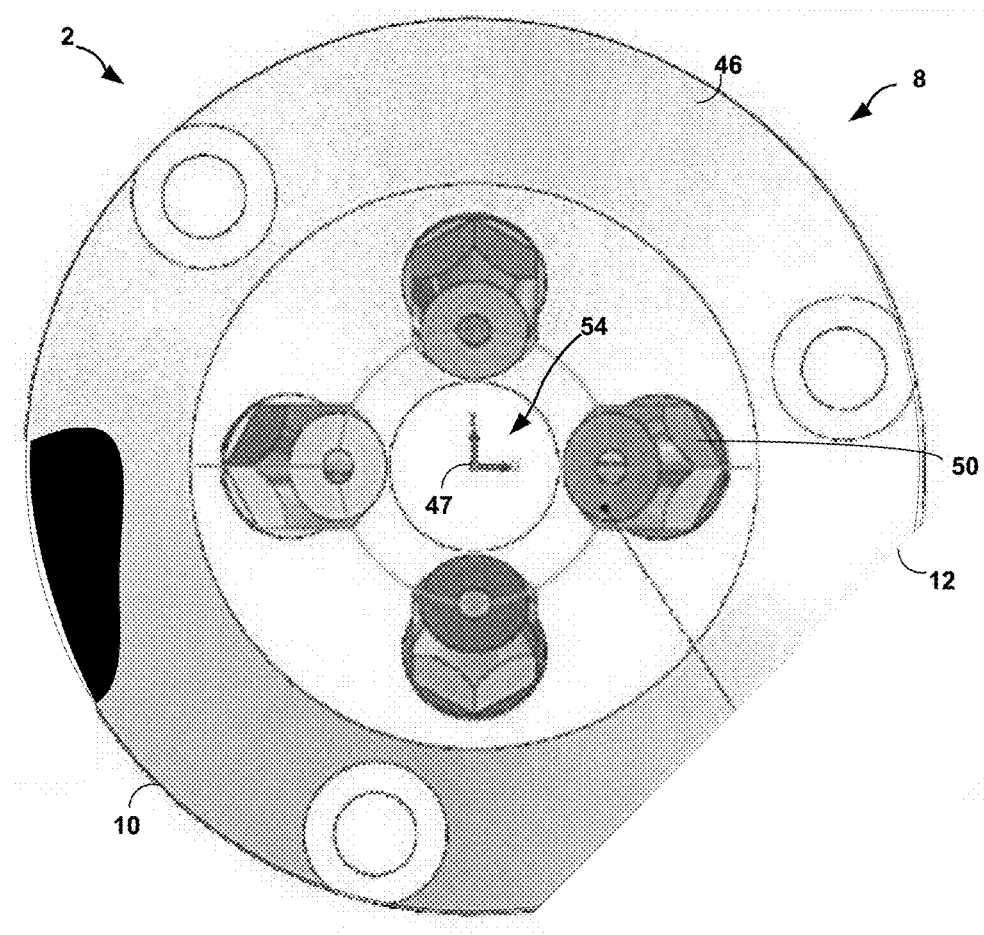
FIG. 4 is a conceptual diagram illustrating a bottom view of the example material deposition head of FIG. 3 in the direction of line A.

In some examples, exterior surface 10, in radial cross-section of first body portion 4, may include one or more curved, planar, or polygonal shapes, portions, or sides. For example, at least a portion (or all) of first body portion 4 may be substantially cylindrical (e.g., cylindrical or nearly cylindrical). In some examples, at least a portion of exterior surface 10 may be planar. For example, as shown in FIGS. 1, 2, and 4, a planar portion 12 of a substantially cylindrical exterior surface 10 may be positioned proximate to second end 8 of first body portion 4 of material deposition head 2.

In some examples, as noted, planar portion 12 of a substantially cylindrical surface 10 of first body portion 4 may allow material deposition head 2 to access narrower spaces during operation. For example and without limitation, inclusion of planar portion 12 in the design of first body portion 4 may enable material deposition head 2 to more easily access leading edges, trailing edges, or blade tips of blisk airfoils. Moreover, in some examples, material deposition head 2, configured as shown in FIG. 1, may be able to deposit material in preferred orientations, as compared to material deposition heads lacking features such as planar portion 12 of first body portion 4.

Figure 2:
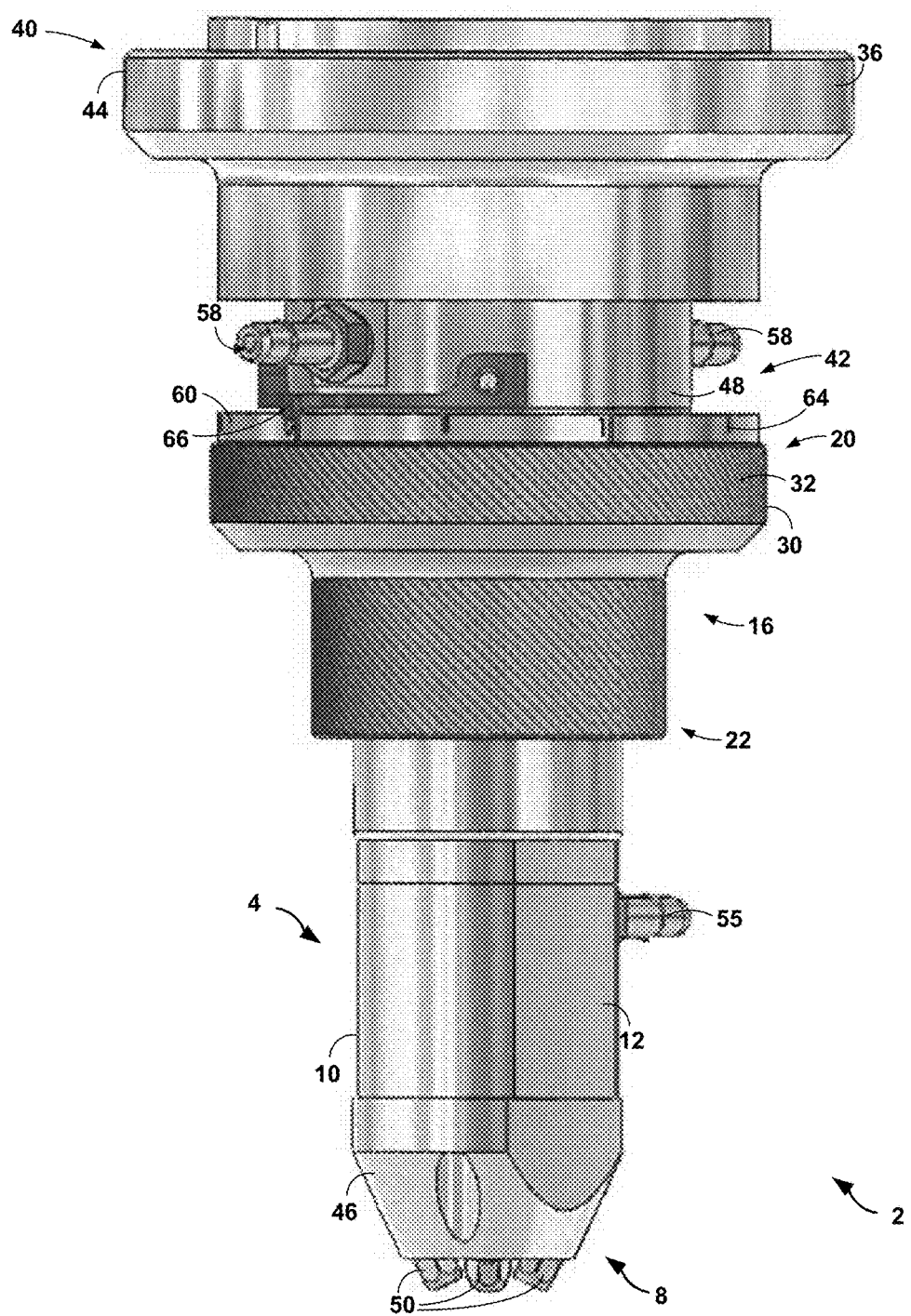
FIG. 2 is a conceptual diagram illustrating a side view of an example material deposition head including a first body portion that is axially translatable relative to a second body portion.

In some examples, exterior surface 10 of first body portion 4 also may include a chamfer 46 proximate to second end 8 of first body portion 4 that tapers radially inwardly, as shown in FIG. 2. FIG. 2 is a conceptual diagram illustrating a side view of material deposition head 2. Chamfer 46 also may enhance the ability of material deposition head 2 to access parts or portions of parts having minimal clearance or small dimensions.

Figure 3:
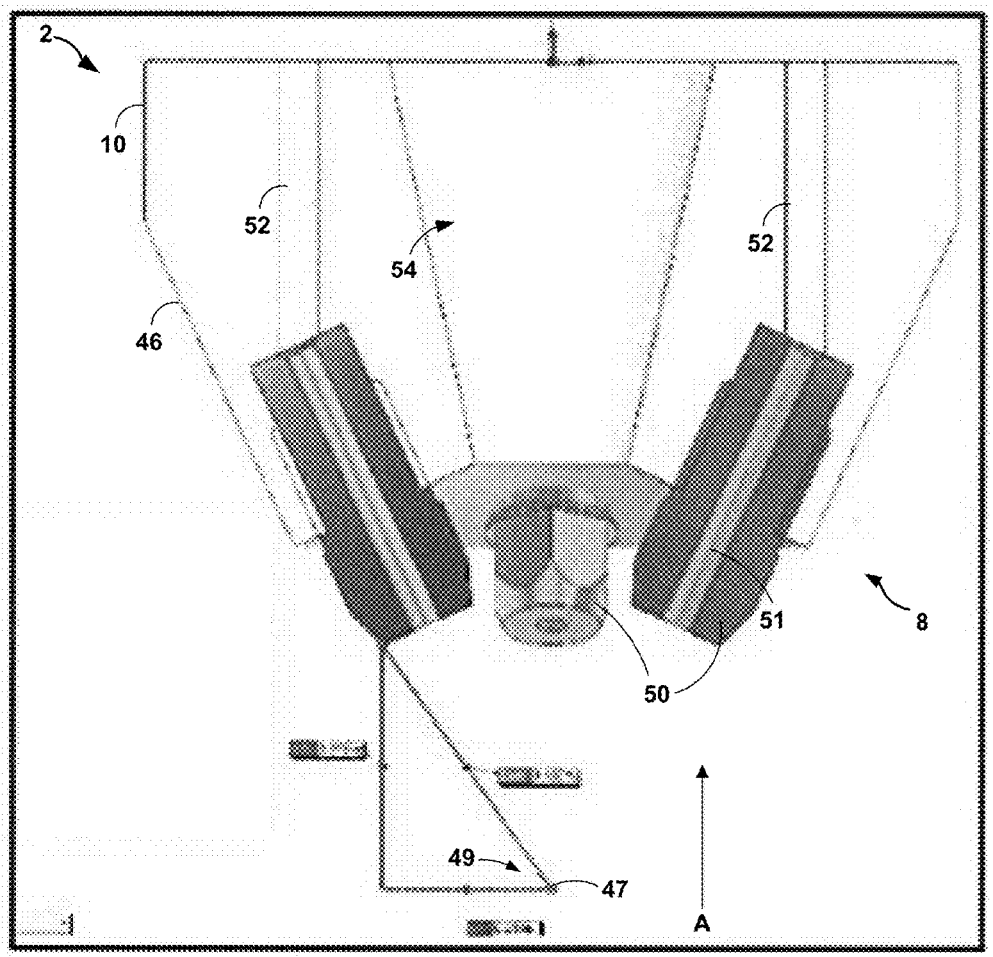
FIG. 3 is a cross-sectional view of a portion of an example material deposition head.

First body portion 4 also includes at least one nozzle 50, which may be coupled proximate to or at second end 8 of first body portion 4. FIG. 3 is a cross-sectional view of first body portion 4 of material deposition head 2, and shows additional details of at least one nozzle 50. The at least one nozzle 50 may be fluidically coupled to at least one material delivery channel 52, which may carry a fluidized powder from a fluidized powder source to the at least one nozzle 50. For example, the at least one material delivery channel 52 may open to an exterior surface of material deposition head, such as exterior surface 10 of first body portion 4. In such an example, material delivery channel 52 may extend from exterior surface 10 of first body portion 4 to the at least one nozzle 50, such that a fluidic connection is made between a fluidized powder source coupled to exterior surface 10 and the at least one nozzle 50.

In some examples, at least one material delivery channel 52 may include a single delivery channel coupled to exterior surface 10, which branches into a plurality of material delivery channels, such that each material delivery channel terminates at and is fluidically connected to a respective nozzle 50 of the at least one nozzle 50. For example, first body portion 4 may define at least one material delivery channel 52 that branches into four material delivery channels. In other examples, multiple material delivery channels may open to an exterior surface of the material deposition head, such as exterior surface 10 of first body portion 4, and lead to multiple nozzles. In examples including multiple material delivery channels terminating at respective nozzles 50, a fluidized powder source and the material delivery channels may be configured such that an approximately even volume of fluidized powder is delivered to each of nozzles 50 during the additive manufacturing process. Further, in some examples, at least one material delivery channel may be connected to a fluid source (e.g., a gas source), while at least one other material delivery channel may be connected to a material source (e.g., a powder source).

In some examples, the material may flow through material delivery channels 52 as a fluidized powder, in which a flowing fluid carries powder of the material through material delivery channels 52. For example, a gas, such as helium, argon, or another substantially inert gas may carry the material. As used herein, a substantially inert gas may include a gas that does not react with a substrate or the material being added to the substrate during the additive manufacturing process. In other examples, non-inert gases (e.g., air) may be utilized as a carrying fluid for powder, or for purging through an internal passage in material deposition head 2.

Each of the at least one nozzle 50 may be attached to first body portion 4 by any suitable mechanism that allow a secure fitting. Further, each of the at least one nozzle 50 may each include a channel 51 that is fluidically coupled to a respective material delivery channel 52 of first body portion 4. Material carried by a fluid, such as a fluidized powder, may be expelled via channel 51 of nozzle 50 and directed into an energy beam and/or adjacent to a surface of a substrate during the additive manufacturing process. The material carried by the fluid, to be deposited adjacent to a substrate, may include, for example, at least one of a metal, an alloy (e.g., an alloy of nickel and titanium), a ceramic, or a polymer.

In some examples, the angle at which at least one nozzle 50 delivers a fluidized powder may be adjustable. For example, the at least one nozzle 50 may be positioned at an acute angle 49 (see FIG. 3), or a right angle with respect to an underlying substrate (not shown). In this way, fluidized powder may be directed toward a selected location (e.g., a selected spot size) along energy beam 56. In some examples, a more acute angle between one or more fluidized powder streams and a substrate may be utilized to allow for a greater addition of material in substantially horizontal directions on the substrate. Additionally or alternatively, a substrate may be movable in at least one dimension relative to material deposition head 2 so that material deposition head 2, and/or components thereof, interact with a selected location on the substrate.

FIG. 4 is a conceptual diagram illustrating a bottom view of the example material deposition head of FIG. 3 in the direction of line A. As shown in FIG. 4, in some examples, at least one nozzle 50 (e.g., four nozzles) may be coupled to second end 8 of first body portion 4. In some examples, the at least one nozzle 50 may be positioned so that a respective stream of fluidized powder from each nozzle crosses, for example, at a focal point 47 or focal region along an energy beam (not shown) that passes through internal passage 54.

In some examples, first body portion 4 also may include one or more means for engaging with other components of material deposition head 2. For example, at least a portion of exterior surface 10 of first body portion 4 may include threading 14. As shown in FIG. 1, in some examples, a substantially cylindrical portion of exterior surface 10 may include threading 14 proximate to first end 6 of material deposition head 2. Threading 14 may have any suitable pitch between threads that facilities precise axial translation of first body portion 4, as discussed in greater detail below.

An example material deposition head 2 also may include one or more components that engage with first body portion 4 to facilitate axial translation of first body portion 4. In some examples, a first ring 16 may encircle first body portion 4. First ring 16 may include an interior surface 18 that extends from a first end 20 of first ring 16 to a second end 22 of first ring 16. In some examples, interior surface 18 of first ring 16 may be substantially cylindrical. For example, a diameter of a substantially cylindrical interior surface 18 of first ring 16 may be approximately the same as or slightly larger than an external diameter of a substantially cylindrical portion of exterior surface 10 of first body portion 4 about which first ring 16 may rotate. Interior surface 18 of first ring 16 may, in some examples, include threading 24. In some of these examples, threading 24 may be disposed on interior surface 18 such that threading 24 may mechanically (e.g., helically) engage with threading 14 of exterior surface 10 of first body portion 4.

For example, ridges of threading 24 may rotate in screwed engagement with troughs of threading 14 to enable axial translation of first body portion 4 relative to first ring 16. First body portion 4 may axially translate relative to first ring 16 in either a first or second axial direction, depending on the direction of rotation of first ring 16 and the orientation of respective threading.

First ring 16 also may include one or more exterior surfaces. For example, first ring 16 may include an exterior surface 30 that extends from first end 20 to second end 22. In some examples, exterior surface 30 may include one or more planar portions. For example, a planar bottom portion 23 of exterior surface 30 may be disposed at second end 22 of first ring 16. Further, exterior surface 30 may have a substantially continuous or varying diameter in radial cross-section. As shown in FIG. 1, example exterior surface 30 has a larger diameter in cross-section proximate to first end 20, and a smaller diameter in cross-section proximate to second end 22. In some examples, portions of first ring 16 having different radial cross-sections, including exterior surface 30, are nonetheless integrally formed throughout the volume of first ring 16.

Further, as shown in FIG. 2, one or more portions of exterior surface 30 of first ring 16 may include a gripping surface 32. Gripping surface 32 may enhance friction between gripping surface 32 and a member applying a torque to first ring 16, as compared to other portions of exterior surface 32 of first ring 16. For example, gripping surface 32 may enhance friction between first ring 16 and a user's hand or a glove on a user's hand, such as a polymer or rubber glove. In some examples, gripping surface 32 may include a plurality of bumps or a pattern of bumps disposed on exterior surface 30 of first ring 16. For example, gripping surface may include a pattern of cross-hatches (e.g., knurling) machined into first ring 16. In addition or alternatively, gripping surface 32 may include a friction-enhancing material that has been applied to at least a portion (or all) of first ring 16, such as a polymer or rubber material, to facilitate gripping of first ring 16. Gripping surface 32 of first ring 16 may facilitate greater precision in rotating first ring 16 about first body portion 4, thereby enabling greater precision in axially translating first body portion 4 along longitudinal axis 26.

In some examples, material deposition head 2 also includes a second body portion 90. In some examples, second body portion 90 may house optical components 102 that focus an energy beam to a focal spot external to material deposition head 2 and proximate to second end 8 of first body portion 4. Second body portion 90 may be substantially axially fixed relative to first ring 16, such that first ring 16 does not substantially move axially relative to second body portion 90. In some examples, first ring 16 may be mechanically coupled to second body portion 90 without impeding rotation of first ring 16. For example, a plurality of pins 63 may mechanically couple first ring 16 to second ring 36 (e.g., a slot in second ring 36), as shown in FIG. 1, yet allow rotation of first ring 16. For example, pins 63 may be adhered to, screwed into, or friction fitted into respective slots or cavities formed in first ring 16 and fit within respective slots in second ring 16 that allow relative rotational movement of first ring 16 and second ring 36.

In some examples, second body portion 90 includes a component that encircles at least a portion of first body portion 4. For example, as shown in FIG. 2, a second ring 36 may encircle part of first body portion 4 proximate to first end 6 of first body portion 4. Second ring 36 may have an interior surface 38 that extends from a first end 40 of second ring 36 to a second end 42 of second ring 36. In some examples, at least a portion (or all) of interior surface 38 of second ring 36 may be substantially cylindrical. For example, a diameter of at least a portion of substantially cylindrical interior surface 38 of second ring 36 may be approximately equal to or slightly larger than a diameter of a substantially cylindrical portion of exterior surface 10 of first body portion 4. In general, a close fit between adjacent surfaces of first body portion 4 and second body portion 90 (e.g., second body portion 90 including second ring 36) may assist in maintaining the alignment and concentricity of first body portion 4 relative to second body portion 90. In some examples, a diameter of interior surface 38 of second ring 36 may vary along the length of second ring 36 from first end 40 to second end 42. For example, as shown in FIG. 1, a diameter of interior surface 38 defined by interior surface 38 may be larger proximate to first end 40, as compared to the diameter of interior surface 38 defined by interior surface 38 proximate to second end 42. Further, in some examples, as shown in FIG. 1, second ring 36 may have a varying volume in cross-section along its length between first end 40 and second end 42. For example, the volume of a cross-section of second ring 36 may periodically thicken or narrow along the length of second ring 36 between first end 40 and second end 42.

Second ring 36 also may include one or more exterior surfaces. For example, second ring 36 may include an exterior surface 44 that extends from first end 40 to second end 42 of second ring 36. Exterior surface 44 may have a varying or substantially continuous diameter in radial cross-section along its length from first end 40 to second end 42. For example, as shown in FIG. 1, example exterior surface 44 may have at least three primary diameters in cross-section along the length of second ring 36 from first end 40 to second end 42. In such an example, exterior surface 44 of second ring 36 may have a largest diameter proximate to first end 40, a smaller diameter in a middle portion of second ring 36, and a smallest diameter proximate to second end 42. For example, as shown in FIG. 1, a portion 48 of exterior surface 44 proximate to second end 42 of second ring 36 may have a smallest diameter, as compared to other portions of second ring 36. In some examples, portions of second ring 36 that have different radial cross-sections may be integrally formed throughout the volume of second ring 36. While exterior surface 44 of second ring 36 may be substantially cylindrical, as shown in FIG. 2, other shapes for exterior surface 44 may be suitable.

Further, in some examples, a first end 40 of second ring 36 may define a cavity into which additional components of material deposition head 2, or additional components associated with the additive manufacturing process, may be disposed. For example, as shown in FIG. 1, certain components associated with an energy source may be disposed within a cavity in second ring 44 proximate to first end 40, such as optical components 102 including a focusing lens. In some examples, the focusing lens within the cavity in second ring 44 may be moved or translated upwardly, to allow more space for first body portion 4 to translate upwardly.

In some examples, a portion (or all) of first ring 16 may have a volume sufficient to accommodate disposal of additional components of material deposition head 2 within the volume of, within a cavity of, or adjacent to, first ring 16, or combinations thereof. Likewise, a portion (or all) of second ring 36 may have a volume sufficient to accommodate disposal of additional components of material deposition head 2 within the volume of, within a slot or cavity of, or adjacent to, second ring 36, or combinations thereof. For example, as described below, respective ends of the plurality of pins 62 may be disposed within a volume in or adjacent to first end 20 of first ring 16 and opposing respective ends of the pins 62 may be fitted into second ring 36 to couple first ring 16 to second ring 36.

In some example implementations, one or more pins of material deposition head 2 may be coupled to second body portion 90 and be configured to engage first body portion 4 to substantially prevent relative rotation between first body portion 4 and second body portion 90. For example, as shown in FIG. 1, at least one pin 34 may be coupled to (or integral with) second ring 36 and be configured to engage first body portion 4 by sliding into at least one slot 35 formed in first body portion 4. Pin 34 may be, for example, a dowel pin, or the like. In some examples, material deposition head 2 may include multiple pins that extend from second body portion 90, each of which engages a respective slot in first body portion 4. For example, as shown in FIG. 1, two pins 34 may be extend downwardly from different locations of second ring 36 into respective slots 35 in first body portion 4, proximate to first end 20 of first body portion 4. In some examples, multiple pins 34 may be evenly spaced to engage slots 35 around a circumference of a cylindrically shaped first body portion 4 (e.g., slots located at opposing points around a circumference of first body portion 4 in radial cross section).

For example, the at least one pin 34 (or multiple pins) may be friction-fitted within slot 35 (or multiple respective slots) in first ring 16, yet first body portion 4 may still translate axially as first ring 16 is rotated. In this way, at least one anti-rotation pin 34 may substantially prevent rotation of first body portion 4 as one or more nozzles 50 of material deposition head 2 are focused, and may maintain a desired radial alignment or spatial relation between one or more nozzles 50 and an energy beam 56 during axial translation of first body portion 4 and nozzles 50. Anti-rotation pins 34 also may maintain alignment between second body portion 90 (e.g., second ring 36) and first body portion 4. Further, in some examples, the depth of slot 35 in first body portion 4 may determine the extent to which first body portion 4 may axially translate. For example, first body portion 4 may be translated to a full extent in an upward direction when at least one pin 34 fully fills slot 35.

Material deposition head 2, and its various components, generally may be composed of any suitable materials that do not interfere with its operation. For example, material deposition head 2 may include one or more materials that do not react with any gas that may be purged through the head, or degrade in the presence of a high-temperature energy beam (such as a laser beam) that may pass through the head. Suitable materials may include, but are not limited to, a metal, such as aluminum or copper, an alloy, such as an aluminum alloy, a copper alloy, stainless steel, a ceramic, or the like. Such materials may, in some examples, exhibit relatively little wear from a fluidized powder or energy beam that passes therethrough.

In some examples, material deposition head 2 may include one or more seals disposed between various components. The seals may be configured and positioned to protect an interior portion of material deposition head 2 (e.g., interior components or an interior volume) from contamination from a number of sources, such as gases in the external environment, or solid, liquid, or gaseous material deflected from a substrate or melt pool during the deposition process. In some examples, as shown in FIG. 1, a seal 28 may be disposed proximate to second end 22 of first ring 16 between interior surface 18 of first ring 16 and exterior surface 10 of first body portion 4. Seal 28 may be embedded within, applied to, or adhered to first ring 16 and/or first body portion 4. In some examples, seal 28 may be substantially annular in shape. For example, seal 28 may include an o-ring that is friction fitted in a groove in interior surface 18 of first ring 16, proximate to second end 22, such that a portion of the o-ring is disposed within the groove and a portion slightly protrudes from the groove.

Seal 28 may substantially prevent (e.g., prevent or nearly prevent) external solid, liquid and/or gaseous materials from contaminating an interior portion of material deposition head 2 or associated optical components. For example, as shown in FIG. 1, seal 28 may substantially prevent external contaminants from contaminating threading 14 of first body portion 4, threading 24 of first ring 16, a gas purged through an internal passage defined by the head, an inert atmosphere maintained during material deposition, and/or optical components 102 used to focus energy beam 56 during operation of material deposition head 2.

Further, seal 28 may be positioned at or near second end 22 of first ring 16, and threading 24 may be disposed along interior surface 18 proximate second end 22 but incepting more proximate to first end 20 of first ring 16 than the position of seal 28. In some examples, one or more seals (such as seal 28) disposed within material deposition head 2 may be composed of an elastomer, rubber, a ceramic, or the like. Such materials may be designed to avoid degradation at elevated temperatures utilized in the additive manufacturing process, yet permit first body portion 4 to slide over the seal 28 during axial translation. As one example, one or more seals may include polytetrafluoroethylene (PTFE). For instance, one or more seals may be Kalrez® seals that include Teflon®, a product manufactured by DuPont. Example seals may retain their mechanical properties (e.g., elasticity) at elevated temperatures.

In addition, in some examples, material deposition heads of this disclosure may include multiple seals. For example, as shown in FIG. 1, material deposition head 2 may include multiple seals along interior surface 18 of first ring 16, such as seal 28 (e.g., a first seal) and a seal 29 (e.g., a second seal). In the example deposition head 2 of FIG. 1, second seal 29 is located at or near first end 20 of first ring 16 and disposed between exterior surface 10 of first body portion 4 and interior surface 18 of first ring 16. In this way, first seal 28 and second seal 29, by virtue of their placement at second end 22 and first end 20 of first ring 16, respectively, substantially prevent external contaminants from contaminating an inner portion of material deposition head 2 as described, such as threadings of components.

Further, in some examples, material deposition head 2 optionally may include a seal between first ring 16 and second body portion 90 also to substantially prevent contamination of an inner portion of material deposition head 2. For example, as shown in FIG. 1, a seal 31 (e.g., a third seal) may be located proximate to first end 20 of first ring 16 and to second end 42 of second ring 16, such that seal 31 is disposed between exterior surface 44 of second ring 36 and interior surface 18 of first ring 16. In this way, seal 31 also may assist in protection of interior components of material deposition head 2 or other additive manufacturing system components. In some examples, an example material deposition head may include either seal 29 or seal 31 in combination with seal 28. In other examples, such as material deposition head 2, seals 28, 29, and 31 may be included.

Figure 5:
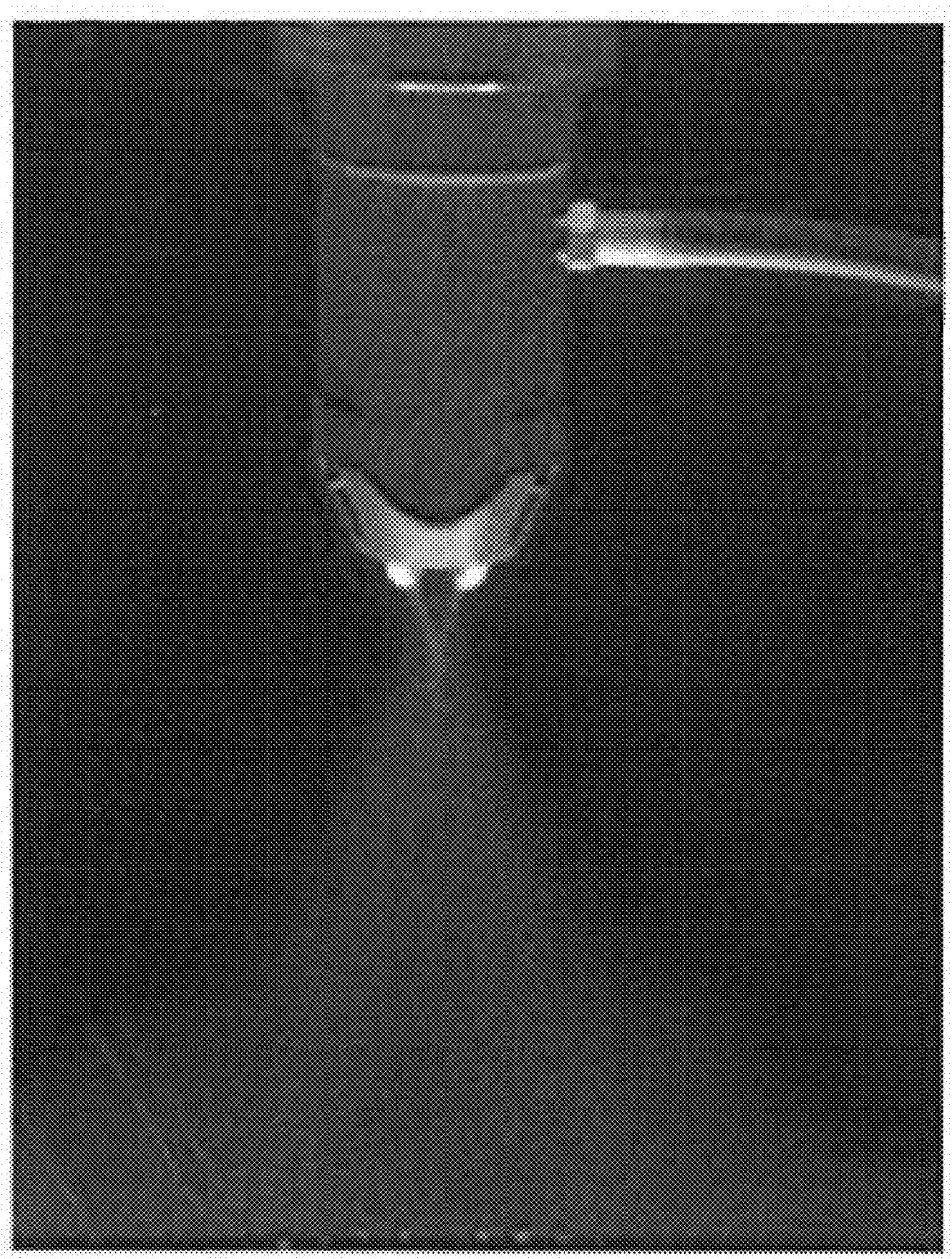
FIG. 5 is a photograph illustrating an example laser material deposition head in operation.

FIG. 5 is a photograph illustrating an example laser material deposition head in operation. The depicted laser material deposition head includes certain features of material deposition head 2. As shown, the laser material deposition head includes nozzles that are positioned so that a respective stream of fluidized powder from each nozzle crosses, for example, at a focal point 47 or focal region of the laser beam. After crossing at or near the focal point or region of the laser beam, the stream of fluidized powder may form a column for at least a portion of the length of the stream, before diverging into a cloud of larger volume. For some example configurations of nozzles, a working range of a columnar portion of the fluidized powder stream may be about 0.100 inches. The length of a columnar portion of a fluidized powder stream may depend, for example, on the orientation of the at least one nozzle 50 and the diameter of channel 51 in each respective nozzle 50. A planar portion on the exterior surface of the material deposition head is also shown in FIG. 5, along with a tube coupled to the exterior surface of the laser material deposition head that carries fluidized powder from a fluidized powder source into the head.

Returning to FIG. 1, first body portion 4 also may include an interior surface 53 that defines an internal passage 54 within first body portion 4. Internal passage 54 may extend from first end 6 to second end 8 of first body portion 4 and be configured to permit passage therethrough of energy beam 56 generated by an energy source. In some example material deposition heads, internal passage 54 may define a diameter sufficient to allow a collimated energy beam 56 with a diameter of about one inch being focused by optical component 102 to pass through internal passage 54 and exit second end 8 without clipping of the energy beam 56. In general, energy beam 56 may pass through internal passage 54 parallel to (e.g., coaxial with) axis 26, exit material deposition head 2 at second end 8, and impact a material discharged from at least one nozzle 50 adjacent to a substrate. Energy from energy beam 56 may be absorbed by the material, such that a pool of molten material is formed on the substrate.

In some examples, interior surface 53 may be substantially annular in radial cross-section (for example, annular or nearly annular), where the circumference of interior surface 53 is less than a circumference of exterior surface 10 of first body portion 4. As shown in FIG. 1, an inner circumference of first body portion 4 defined by interior surface 53 may decrease, and internal passage 54 defined by interior surface 53 may narrow, when measured in a direction moving from first end 6 toward second end 8 of first body portion 4 of material deposition head 2. In other examples, an inner circumference of first body portion 4 defined by interior surface 12 may stay substantially constant when measured in a direction moving from first end 6 toward second end 8.

In some examples, a gas may be purged through internal passage 54 of first body portion 4, flowing from first end 6 to second end 8 of first body portion 4. The gas may be sourced from, for example, a gas source coupled to material deposition head 2. In some examples, such a gas source may be coupled to second ring 36 of material deposition head 2. For example, a gas source may be fluidically coupled to internal passage 54 of first body portion 4 via one or more connectors 58 (see FIG. 2) attached to portion 48 of exterior surface 44 of second ring 36. In some example implementations, gas from the gas source may enter internal passage 54 via an inlet in second body portion 90, for example, via an inlet 37 in interior surface 38 of second ring 36 as shown in FIG. 1.

In example material deposition heads that include a narrowing inner circumference of first body portion 4, the velocity of gas flowing through internal passage 54 may increase as the gas flows from first end 6 to second end 8, increasing cooling or heat transfer when the gas deflects from the substrate back toward material deposition head 2. A gas passing through internal passage 54 with an increased velocity also may provide improved protection to optics components (e.g., lenses or an energy source, such as a laser) from splatter (e.g., metal splatter from the melt pool of material deposited on a substrate). In some examples, a narrowing internal passage 54 may create additional space at second end 8 of first body portion 4 for placement of additional components, such as one or more nozzles 50 coupled to second end 8 of first body portion 4.

In some examples, material deposition head 2 may further include one or more additional components affixed to one or more exterior surface of material deposition head 2, such that the one or more additional components are configured to indicate an axial position of first body portion 4 and/or one or more nozzles 50 coupled to first body portion 4. For example, material deposition head 2 also may include a wheel 60 configured to rotate in conjunction with first ring 16, as shown in FIG. 2. Wheel 60 may encircle first body portion 4 and be affixed to first end 20 of first ring 16. Further, in some examples, wheel 60 may be attached to first ring 16 by a plurality of screws, pins 62 (see FIG. 1), or any other suitable attachment technique. For example, as shown in FIG. 2, wheel 60 may be affixed to a top exterior surface of first ring 16 by pins 62. In other examples, wheel 60 may be integral with first end 20 of first ring 16. In some examples, wheel 60 may be annular in shape, and have a circumference substantially equal to that of first ring 16.

Wheel 60 may include a plurality of markings disposed on or machined into at least an exterior surface of wheel 60, such that a user may see the plurality of markings. The plurality of markings may be spaced around the circumference of wheel 60 to indicate rotational increments of first ring 16 (e.g., degrees of rotation), which correlate to translational increments of first body portion 4 and one or more nozzles 50. In some examples, the plurality of markings may include a plurality of hatch marks 64, a plurality of numbers (e.g., consecutive integers or fractional numbers), or both. In some examples, the plurality of markings may include a plurality of grooves defined in wheel 60, and evenly spaced around a circumference of wheel 60, into which a pointer 66 may slidably engage.

Thus, rotating first ring 16 in a clockwise or counter-clockwise direction by one increment (e.g., from one hatch mark to an adjacent hatch mark) may cause first body portion 4 to axially translate by a corresponding increment along axis 26 (see FIG. 1) in a first or a second direction (e.g., "up" or "down" in the perspective of FIG. 2). A rotational distance traveled by first ring 16 between each increment or marking on wheel 60 may not necessarily be the same translational distance traveled by first body portion 4 due to the incremental rotation.

In some examples, material deposition head 2 also may include a pointer 66, as shown in FIG. 2, for identification of the rotational position of wheel 60, which indicates the axial position of the at least one nozzle 50, first body portion 4, or both. Pointer 66 may include, for example, a body and a tab protruding from the body. The body of pointer 66 may be affixed proximate to second end 42 of second ring 36. For example, one or more ends of the body of pointer 66 may be attached to portion 48 of exterior surface 44 of second ring 36 by one or more pins, screws, or the like. Further, a tab may protrude from the body of pointer 66, such that the tab is disposed adjacent to wheel 60 or slidably engages with a plurality of grooves in wheel 60. In such examples, the tab of pointer 66 is configured to align with the plurality of markings as first ring 16 is rotated. In this way, wheel 60 may move (e.g., rotate) relative to pointer 66, and a position of pointer 66, or a tab of pointer 66, may indicate to a user an axial position of first body portion 4 and/or the one or more nozzles 50 coupled to first body portion 4.

As an example, for a wheel 60 including five hatch marks 64, each hatch mark being designated with a number zero through four respectively, rotating first ring 16 toward a more positive integer may raise the at least one nozzle 50 relative to second ring 36 and second body portion 90, while rotating first ring 16 toward a more negative integer may lower the at least one nozzle 50 relative to second ring 36 and second body portion 90. In some examples, one full revolution of first ring 16 may cause nozzles 50 to coaxially translate a distance of about 0.050 inches along axis 26. Accordingly, in such an example, rotating first ring 16 such that the pointer 66 moves from one hatch mark to an adjacent hatch mark (one increment) axially translates the at least one nozzle 50 about 0.010 inches. Further, the alignment of pointer 66 with a particular number on wheel 60 may indicate to a user a relative (or precise) translational position of the at least one nozzle 50, depending, e.g., on the full range of axial translation for which the at least one nozzle 50 and first body portion 4 are configured.

In some examples, determining a translational or axial position of at least one nozzle 50 of material deposition head 2 may include consideration of additional information or use of additional measurement devices. For example, a user may utilize another, external translational position tool to make a more coarse measurement of the position of at least one nozzle 50 (described in greater detail herein). Further, a user may consider information such as a range through which nozzles 50 and first body portion 4 are configured to translate in a direction along axis 26, for example, a maximum distance of coaxial translation that may be induced by rotation of first ring 16. In some examples, a range of axial translation of at least one nozzle 50 (relative to second body portion 90 or second ring 36) may be at least about 0.500 inches (about 12.7 mm).

Figure 6:
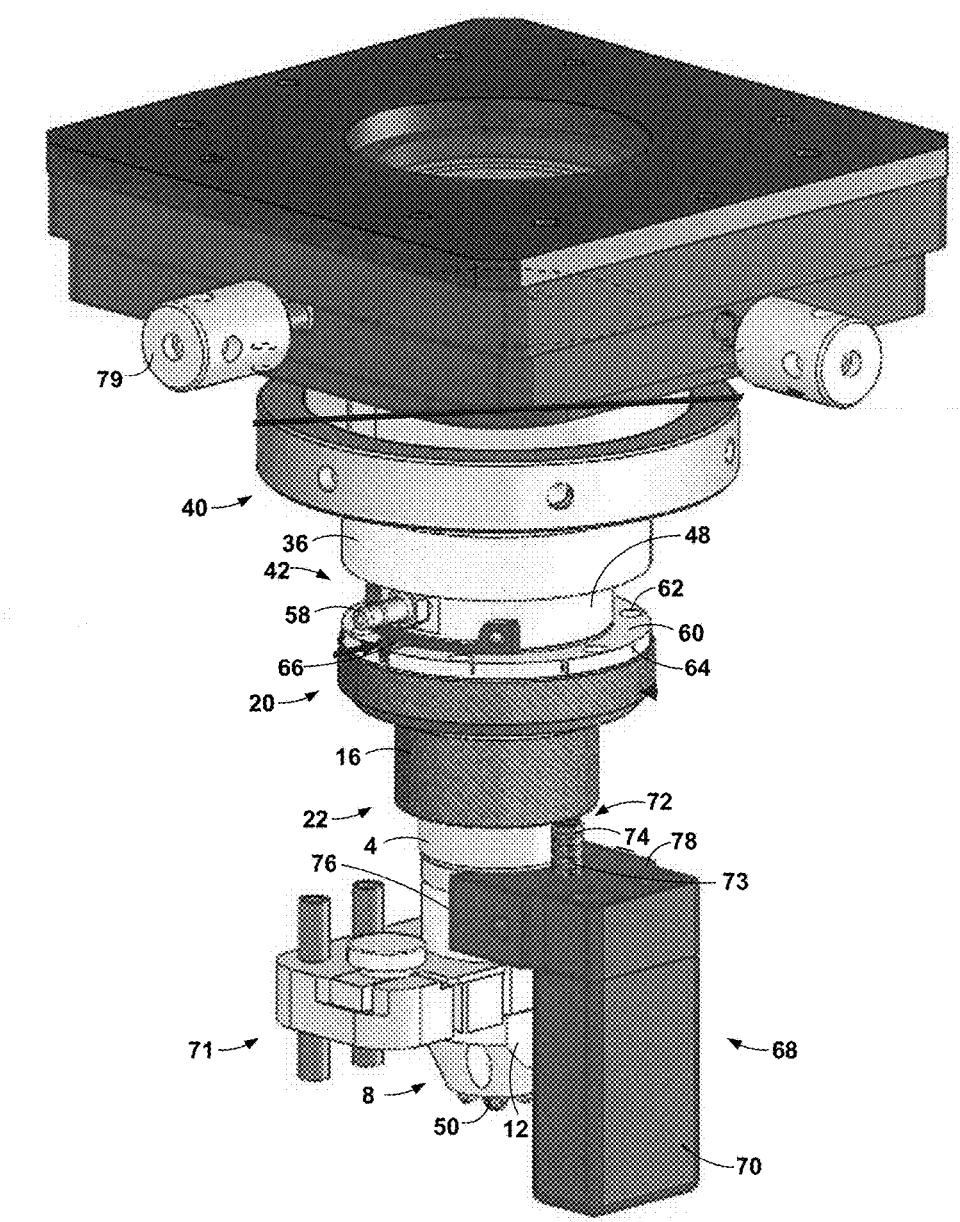
FIG. 6 is a conceptual diagram illustrating a perspective view of an example material deposition head and a translational measurement tool.

FIG. 6 is a conceptual diagram illustrating a perspective view of an example material deposition head 2 and a translational measurement tool 68. As shown in FIG. 6, in some examples, a translational measurement tool 68 may engage with material deposition head 2 to measure a translational (or axial) position of the at least one nozzle 50. Translational measurement tool 68 may be a separate component from material deposition head 2. For example, translational measurement tool 68 may be utilized by a user to determine a coarse axial position of the at least one nozzle 50, without having to disassemble material deposition head 2, break an inert atmospheric environment in place during the additive manufacturing process, or both.

For example, as shown in FIG. 6, translational measurement tool 68 may include at least a handle 70 and a plunger 72. In some examples, handle 70 may be generally L-shaped and include a plurality of faces, such as rectangular faces. In general, translational measurement tool 68 is configured to engage with first body portion 4 and first ring 16 to measure an axial position of first body portion 4, one or more nozzles 50, or both. In some examples, a front face 76 of handle 70 may be planar and rectangular in shape, such that front face 76 is configured to engage with planar portion 12 of exterior surface 10 of first body portion 4. Moreover, a top surface 78 of handle 70 also may be planar, such that top surface 78 is configured to engage with a planar portion 13 of exterior surface 10 (see FIG. 1) of first body portion 4.

In some examples, plunger 72 may be cylindrical and configured to slide within a cylindrical cavity defined within handle 70. In some of these examples, each notch of plurality of notches 74 on plunger 72 may be annular and oriented orthogonal to the axial length of plunger 72. Notches 74 may be evenly spaced along the length of plunger 72, as shown in FIG. 6. Plunger 72 also may include a plurality of rings 73 oriented parallel to and disposed between notches 74.

In some examples, a spring-loaded ball (not shown) within handle 70 may be disposed in a direction orthogonal to the cavity in handle 70 that receives plunger 72. The spring-loaded ball may slidably engage each notch of plurality of notches 74. For example, as plunger 72 is depressed, the spring-loaded ball may exert a compressive force on plunger 72, and notches 74 as they are traversed, sufficient to prevent plunger 72 from being depressed to the fully allowable extent (until plunger 72 is actually fully depressed into the cavity in plunger 72). Thus, for example, before engagement with material deposition head 2, a user may pull plunger 72 upward so that accurate measurement may be made.

Plunger 72 and the cavity in handle 70 in which plunger 72 is received may be located proximate to front face 76. Accordingly, when a user engages front face 76 of handle 70 with planar portion 12 of first body portion 4 and top surface 78 of handle 70 with planar portion 13 of first body portion 4, plunger 72 also engages planar bottom portion 23 of first ring 16 (see FIG. 1). In such an example, an extent of axial translation of first body portion 4 may be measured based on the number of rings 73 and/or notches 74 on plunger 72 that are exposed above top surface 78 of translational measurement tool 68. As shown in FIG. 1, a distance between planar portion 13 of first body portion 4 and planar bottom portion 23 of first ring 16 corresponds to an extent of axial translation of first body portion 4 (and nozzles 50) caused by rotation of first ring 16. In some examples, each full revolution of first ring 16 corresponds to exposure or depression of one ring or one notch along plunger 72. For example, advancement of one notch represents 0.050 inches of axial translation of at least one nozzle 50, where each full revolution of first ring 16 translates nozzles 50 by 0.050 inches.

For example, in reference to FIG. 1, when first ring 16 has been rotated such that first body portion 4 has been coaxially translated in a downward direction along axis 26 (e.g., lowered) to a full extent allowed by the engagement between threading 14 of first body portion 4 and threading 24 of first ring 16, upon engaging first body portion 4 and planar bottom portion 23 of first ring with front face 76 and plunger 72, respectively, a maximum number of rings 73 and notches 74 (e.g., four and three, respectively) may be visible on plunger 72.

Figure 7:
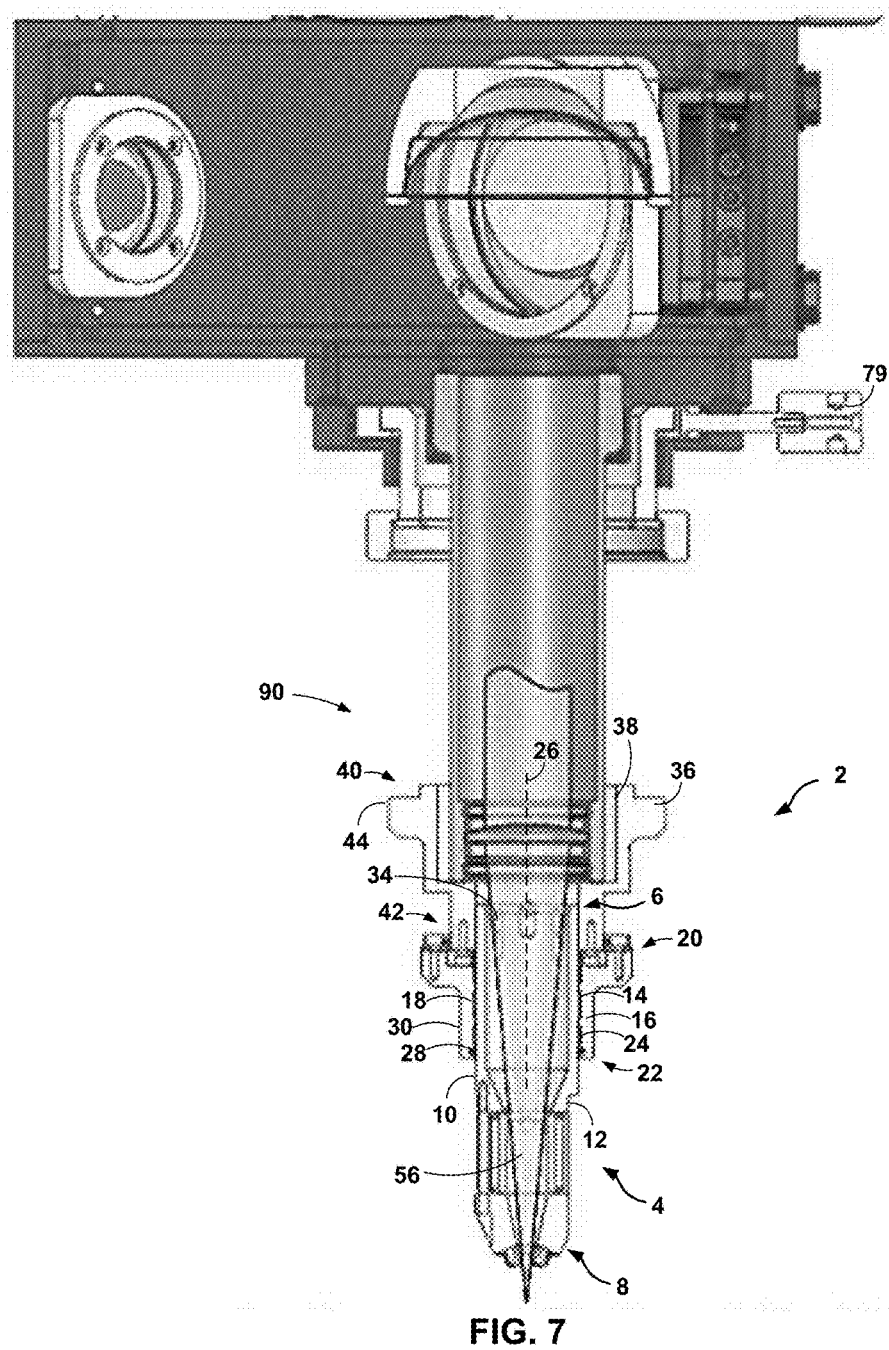
FIG. 7 is another conceptual diagram illustrating a radial cross-section of an example material deposition head.

In some examples, material deposition head 2 may include a mechanism for adjusting at least one nozzle 50 in horizontal directions (e.g., normal to axis 26) to adjust the location for delivery of a fluidized material by nozzles 50 relative to the position of the focal spot of energy beam 56. For example, as shown in FIG. 6, at least two knobs 79 may allow a user to translate first body portion 4 and one or more nozzles 50 in the plane normal to axis 26 (e.g., in an x direction and a y direction, respectively). FIG. 7 is another conceptual diagram illustrating a radial cross-section of example material deposition head 2 and includes additional features of material deposition head 2 or related system components. For example, FIG. 7 shows a cross-section of one knob of the at least two knobs 79 whose position may be adjusted by turning (e.g., screwing) knob 79 in a clockwise or counter-clockwise direction to translate material deposition head 2, including first body portion 4 and at least one nozzle 50, in the plane normal to axis 26.

Figure 8:
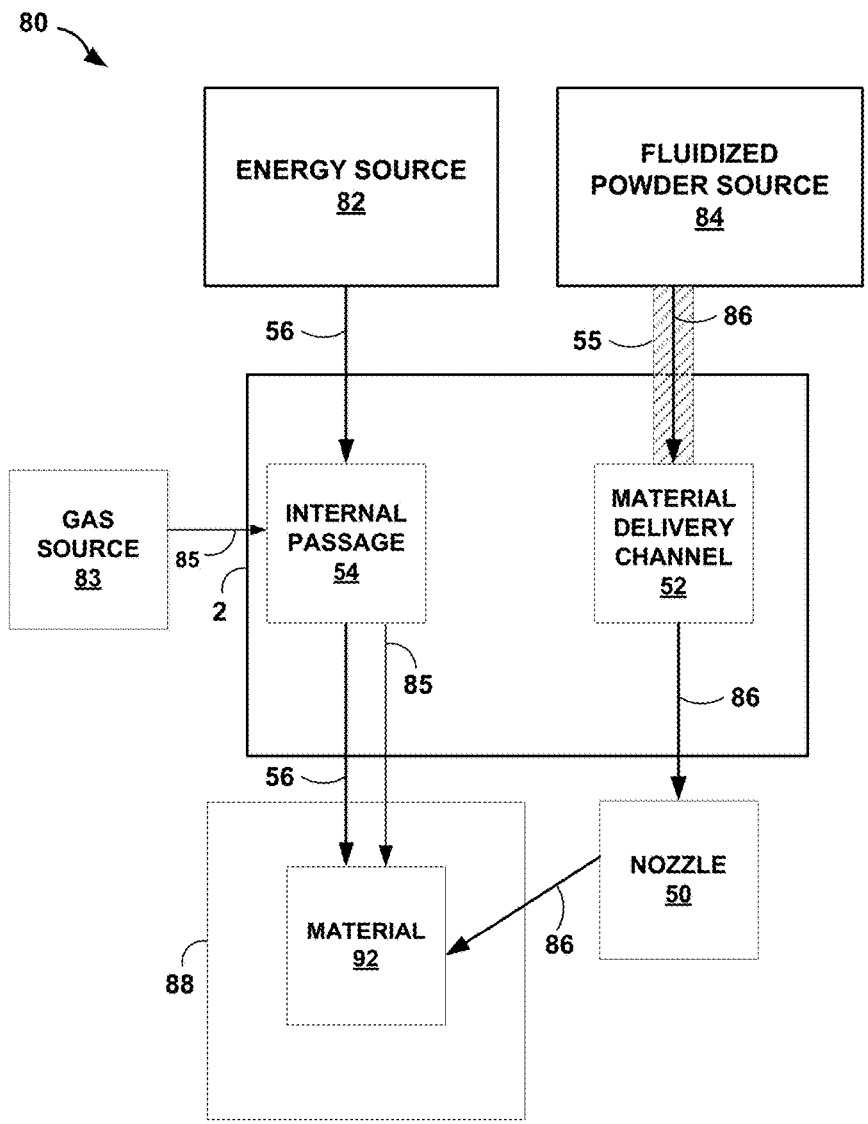
FIG. 8 is a conceptual block diagram of an example system including a material deposition head.

FIG. 8 is a conceptual block diagram of an example system 80 including a material deposition head 2. For example, material deposition head 2 of system 80 may include some or all of the various features described herein with respect to material deposition head 2 and FIGS. 1-4, 6 and 7. As described above, first body portion 4 of material deposition head 2 may define at least one material delivery channel 52 that fluidically connects and extends from, for example, exterior surface 10 of first body portion 4 to at least one nozzle 50. The at least one material delivery channel 52 of first body portion 4 of material deposition head 2 may be configured to permit passage of a fluidized powder 86 therethrough, as represented in FIG. 8. Fluidized powder 86 may be supplied by a fluidized powder source 84 coupled to at least one material delivery channel 52 of first body portion 4 of material deposition head 2 of system 80. Fluidized powder 86 may include, for example, metal, alloy, ceramic, or polymeric particles carried by a gas. Fluidized powder source 84 may include, for example, a source of helium, argon, or other substantially inert gas fluidically coupled with a source of powder, such as metal, alloy, ceramic, or polymeric particles. In some examples, fluidized powder source 84 may be subject to pressure or vacuum, to enable delivery of fluidized powder 86 from fluidized powder source 84 through a tube (such as connector 55), material delivery channel 52, and channel 51 of one or more nozzles 50 (see FIG. 3). In some examples, fluidized powder source 84 may be configured to continuously feed about 4 grams of material per minute through at least one material delivery channel 52 to be deposited on a substrate.

System 80 of FIG. 8 also may include an energy source 82 coupled to (e.g., mechanically coupled to, or positioned in alignment with) internal passage 54 defined by interior surface 53 of first body portion 4 of material deposition head 2. Energy source 82 may generate an energy beam 56 that passes through internal passage 54 and heats a material 92 within a stream of fluidized powder 86. Further, energy source 82 may be selected to provide energy beam 56 with a predetermined wavelength or wavelength spectrum that may be absorbed by and heat material 92. As described above, material 92 may include, for instance, metal, alloy, ceramic, or polymeric particles.

In some examples, energy source 82 may include a laser, plasma source, plasma arc, electrical arc, ultraviolet energy source, infrared energy source, induction coil, or another source of energy coupled to material deposition head 2. Example laser sources include a $CO_2$ laser, a Nd:YAG laser, a Fibre laser, or the like. A laser may operate during the additive manufacturing process to heat, sinter, or melt the material being added or joined to a substrate 88 at temperatures in the range of 1000° C. to 4000° C. with respect to materials such as polymers, including copolymers, thermoplastics, and thermosets; ceramics, including carbides, nitrides, and oxides; metals, alloys (e.g., nickel-base alloys and titanium-based alloys), ferrous metallic alloys, or non-ferrous metallic alloys. Thus, an example system 80 may include a laser positioned to direct a laser beam through internal passage 54 to impact material 92 carried in a stream of fluidized powder 86 and directed into the laser beam via at least one nozzle 50.

In some examples, an example system 80 of FIG. 8 may further include a gas source 83 that is fluidically coupled to internal passage 54 of first body portion 4. For example, gas source 83 may be coupled to portion 48 of second ring 36 via one or more connectors 58 (e.g., two connectors 58, see FIG. 2). In some examples, two connectors 58 may be diametrically opposed in their attachment to portion 48 of second ring 48 to enable an optimal, even flow of gas through internal passage 54.

Thus, as represented in FIG. 8, gas source 83 may be configured to purge a gas 85 through internal passage 54, such as helium, argon, or any other substantially inert gas. Purging a substantially inert gas 85 through internal passage 54 may, for example, maintain the purity of the environment surrounding deposition (e.g., prevent or reduce oxidation of deposited metal) and exert a pressure to prevent or reduce deflection of solid or liquid material back into internal passage 54 or on to exterior or interior components of material deposition head 2. Thus, gas 85 flows through internal passage 54, exits second end 8 of first body portion 4, and impacts substrate 88 and/or material 92 to maintain an outward flow of gas from material deposition head 2.

In addition, in some example systems of this disclosure, a gas takeoff assembly may be coupled with material deposition head 2. For example, as shown in FIG. 6, a gas takeoff assembly 71 may be positioned to engage exterior surface 10 of first body portion 4. Gas takeoff assembly 71 may include one or more sensors adjacent to the deposition area. For example, one or more sampling inlets may be respectively associated with one or more sensors to sense atmospheric conditions adjacent to the location at which material deposition is occurring. For example, the one or more sensors may sense oxygen concentration to reduce or substantially prevent oxidation of deposited metal material and/or may sense moisture in the atmospheric environment surrounding material deposition head 2.

Figure 9:
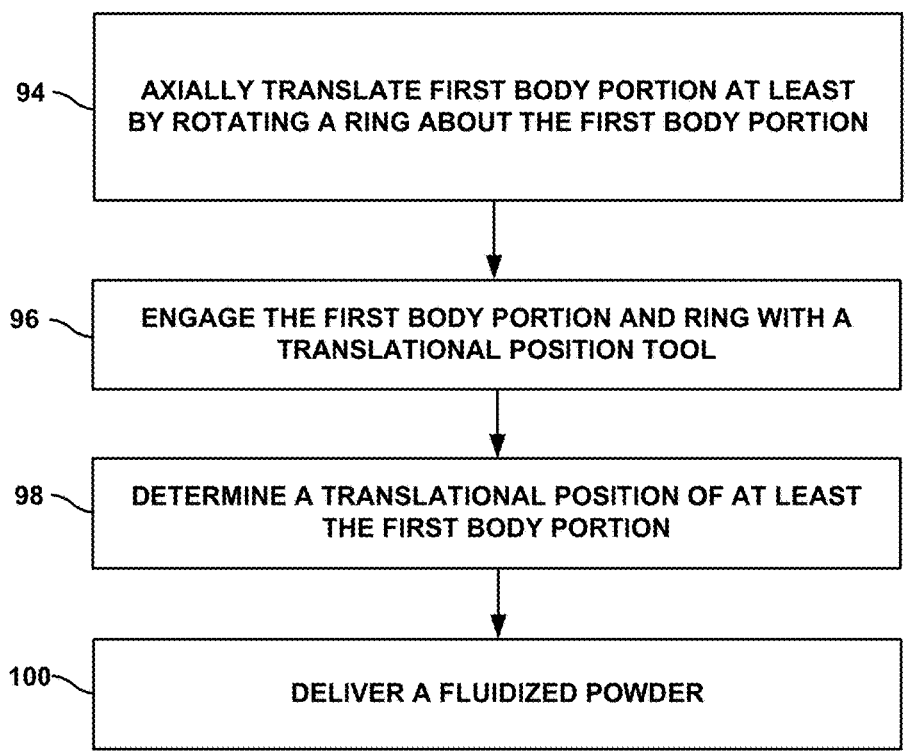
FIG. 9 is a flow diagram illustrating an example technique of this disclosure.

FIG. 9 is a flow diagram illustrating an example technique of this disclosure. In some examples, axially translating first body portion 4 of material deposition head 2 relative to second body portion 90 may include at least rotating first ring 16 about first body portion 4 (94). Upon rotating first ring 16, threading 24 of interior surface 18 of first ring 16 may engage threading 14 of exterior surface 10 of first body portion 4 to axially translate first body portion 4 and the at least one nozzle 50 coupled to first body portion 4. In some example techniques, one or more anti-rotation pins 34 coupled to second ring 36 (as described above) may engage slots 35 formed in first body portion 4 to substantially prevent (e.g., prevent or nearly prevent) relative rotational motion between second ring 36 and first body portion 4.

In some examples, a technique may further include engaging first body portion 4 and second end 22 of first ring 16 with translational measurement tool 68 (96), as described above. In engaging translational measurement tool 68 with material deposition head 2, slidable plunger 72 (e.g., a moveable sliding plunger) may be depressed within a cavity in handle 70 to a depth corresponding to an axial position of first body portion 4 and at least one nozzle 50.

In some examples, a technique of this disclosure also may include determining a translational position of first body portion 4, at least one nozzle 50, or both, based at least on the position of plunger 72 of translational measurement tool 68 and the alignment of pointer 66 (98). For example, as described above, engagement of material deposition head 2 with translational measurement tool 68 may allow a user to determine a coarse position of at least one nozzle 50 based on the depth of depression of plunger 72 by planar bottom portion 23 of first ring 16 within handle 70 of translational measurement tool 68. Further, depending on the range through which first body portion 4 is configured to axially translate, a user may consider a fine position of the at least one nozzle 50, in addition to the determined coarse position, to determine a more precise translational position of the at least one nozzle 50. For example, a user may determine the fine position of the at least one nozzle 50 by identifying the marking (e.g., hatch mark 64 and/or number) with which pointer 66 is aligned on wheel 60.

In some examples, as described above, second body portion 90 may house optical components (e.g., one or more focusing lenses) that focus an energy beam to a spot external to material deposition head 2 and proximate to second end 8 of first body portion 4 of material deposition head 2. In some of these examples, axially translating first body portion 4 by rotating first ring 16 may include rotating first ring 16 about first body portion 4 until a focal point or focal region of fluidized powder 86 delivered by one or more nozzles 50 aligns with the spot at which the energy beam is focused.

In some examples, either before or after any of the other steps described herein, a technique of this disclosure may further include delivering fluidized powder 86 from fluidized powder source 84, as described above. For example, after determining the translational position of at least one nozzle 50 (98), a technique may also include delivering at least some (or all) fluidized powder 86 from fluidized powder source 84 to a focal point 47 or focal region of fluidized powder 86 (100). In this way, at least some (or all) of fluidized powder 86 is delivered into the path of energy beam 56 (e.g., at a selected spot size of energy beam 56) adjacent to substrate 88. Fluidized powder 86 may be purged through at least one material delivery channel 52 and exit the at least one nozzle 50 (e.g., four nozzles) via respective channels 51 in each nozzle of the at least one nozzle 50. In some of these examples, the at least one nozzle 50 arranged in a confocal configuration may deliver fluidized powder 86 toward a focal point 47 or focal region that intersects with the path of energy beam 56 passing through internal passage 54 of material deposition head 2 (see, for example, FIGS. 3 and 5).

Various examples have been described. These and other examples are within the scope of the following claims.

What is claimed is:

1. A material deposition head comprising:
 a first body portion comprising a first end, a second end, an exterior surface extending from the first end to the second end, and at least one slot, wherein at least a portion of the exterior surface includes threading;
 a ring comprising a first end, a second end, and an interior surface extending from the first end of the ring to the second end of the ring, wherein the ring encircles the first body portion, at least a portion of the interior surface comprises threading, and the threading of the interior surface of the ring engages the threading of the exterior surface of the first body portion;
 a second body portion substantially axially fixed to the ring and configured to allow relative rotational movement of the ring; and
 at least one pin coupled to the second body portion that engages the first body portion by sliding into the at least one slot to substantially prevent relative rotation between the first body portion and the second body portion, wherein the first body portion moves axially relative to the second body portion when the ring is rotated about the first body portion.

2. The material deposition head of claim 1, further comprising one or more seals disposed between components of the material deposition head to substantially prevent contamination of an interior portion of the material deposition head from the external environment.

3. The material deposition head of claim 2, wherein a first seal is disposed between the exterior surface of the first body portion and the interior surface of the ring, a second seal is disposed between an exterior surface of the second body portion and the interior surface of the ring, and the first and second seals substantially prevent external contaminants from contaminating at least the threading on the exterior surface of the first body portion and the threading on the interior surface of the ring.

4. The material deposition head of claim 1, further comprising one or more additional components affixed to one or more exterior surfaces of the material deposition head, wherein the one or more additional components are configured to indicate an axial position of at least the first body portion.

5. The material deposition head of claim 4, wherein the one or more additional components include a wheel and a pointer, wherein the wheel is affixed to a top exterior surface of the ring, wherein the wheel comprises a plurality of markings, wherein the pointer is affixed to an exterior surface of the second body portion, wherein the pointer is further disposed adjacent to the wheel, and wherein the wheel moves relative to the pointer, the pointer indicating an axial position of at least the first body portion of the material deposition head via the plurality of markings.

6. The material deposition head of claim 1, further comprising one or more nozzles coupled to the first body portion proximate to the second end of the first body portion, wherein the first body portion defines at least one material delivery channel fluidically coupling the one or more nozzles to a fluidized powder source, and wherein an interior surface of the first body portion defines an internal passage that extends from the first end of the first body portion to the second end of the first body portion.

7. The material deposition head of claim 6, wherein the one or more nozzles comprises a plurality of nozzles coupled to the second end of the first body portion, and wherein the at least one material delivery channel branches into a plurality of material delivery channels, each material delivery channel of the plurality of material delivery channels being fluidically connected to a respective nozzle of the plurality of nozzles.

8. The material deposition head of claim 1, wherein the second body portion houses optical components configured to focus an energy beam to a spot external to the material deposition head and proximate to the second end of the first body portion.

9. A system comprising:
a fluidized powder source;
a material deposition head comprising:
    a first body portion comprising a first end, a second end, an exterior surface extending from the first end to the second end of the first body portion, an interior surface that defines an internal passage extending from the first end to the second end of the first body portion, and at least one slot, wherein the internal passage is configured to permit passage of an energy beam therethrough, and wherein at least a portion of the exterior surface of the first body portion includes threading;
    a ring comprising a first end, a second end, and an interior surface extending from the first end to the second end, wherein at least a portion of the interior surface of the ring comprises threading, and wherein the ring is configured to encircle and rotate about the first body portion, wherein the first body portion is configured to move axially relative to a second body portion when the ring rotates about the first body portion;
    a second body portion substantially axially fixed to the ring and configured to allow relative rotational movement of the ring;
    at least one pin coupled to the second body portion, wherein the at least one pin is configured to engage the first body portion by sliding into the at least one slot to substantially prevent relative rotation between the first body portion and the second body portion;
    one or more nozzles coupled to the first body portion proximate to the second end of the first body portion, wherein the first body portion further defines at least one material delivery channel that fluidically couples the one or more nozzles to a fluidized powder source, wherein the fluidized powder source is fluidically connected to the at least one material delivery channel, and wherein the one or more nozzles are configured to deliver a fluidized powder from the fluidized powder source to a focal point or region adjacent to a substrate; and
an energy source configured to deliver the energy beam through the internal passage defined by the interior surface of the first body portion.

10. The system of claim 9, wherein the material deposition head further comprises one or more seals disposed between components of the material deposition head to substantially prevent external contaminants from contaminating an interior portion of the material deposition head.

11. The system of claim 10, wherein a first seal is disposed between the exterior surface of the first body portion and the interior surface of the ring, a second seal is disposed between an exterior surface of the second body portion and the interior surface of the ring, and the first and second seals substantially prevent external contaminants from contaminating at least the threading on the exterior surface of the first body portion and the threading on the interior surface of the ring.

12. The system of claim 9, wherein the material deposition head further comprises one or more additional components affixed to one or more exterior surfaces of the material deposition head, wherein the one or more additional components are configured to indicate an axial position of the one or more nozzles.

13. The system of claim 12, wherein the one or more additional components include a wheel and a pointer, wherein the wheel is affixed to the ring, wherein the wheel includes a plurality of markings, wherein the pointer is affixed to the second body portion, wherein the pointer is configured to align with a marking of the plurality of markings on the wheel as the ring is rotated to indicate an axial position of the one or more nozzles.

14. The system of claim 9, wherein the one or more nozzles comprises a plurality of nozzles coupled proximate to the second end of the first body portion, and wherein the at least one material delivery channel branches into a plurality of material delivery channels, each material delivery channel of the plurality of material delivery channels being fluidically connected to a respective nozzle of the plurality of nozzles.

15. The system of claim 9, further comprising a gas source, wherein the gas source is fluidically coupled to the internal passage defined by the interior surface of the first body portion, and wherein the gas source is configured to purge a gas through the internal passage.

16. The system of claim 9, wherein the system further comprises a translational position tool configured to measure a translational position of at least the one or more nozzles.

17. The system of claim 9, wherein the second body portion of the material deposition head is configured to house optical components, wherein the optical components are configured to focus the energy beam to a spot external to the material deposition head and proximate to the second end of the first body portion.

18. A method comprising:
axially translating a first body portion of a material deposition head relative to a second body portion of the material deposition head by rotating a ring of the material deposition head, wherein the ring comprises threads threadedly engaged with threads of the first body portion, wherein at least one pin coupled to the second body portion engages the first body portion by sliding into at least one slot and substantially prevents rotation of the first body portion relative to the second body portion during axial translation of the first body portion,
wherein the material deposition head comprises:
    the first body portion, the first body portion comprising a first end, a second end, the exterior surface extending from the first end to the second end, and the at least one slot, wherein at least a portion of the exterior surface includes threading;
    the ring comprising a first end, a second end, and an interior surface extending from the first end to the second end, wherein the ring encircles the first body portion, and wherein at least a portion of the interior surface includes threading;

the second body portion substantially axially fixed to the ring and configured to allow relative rotational movement of the ring;

the at least one pin coupled to the second body portion; and one or more nozzles coupled to the first body portion proximate to the second end of the first body portion.

19. The method of claim 18, wherein the material deposition head further comprises a wheel and a pointer, wherein the wheel is affixed to the ring, wherein the wheel comprises a plurality of markings, wherein the pointer is affixed to the second body portion, and wherein axially translating the first body portion by rotating the ring comprises rotating the ring about the first body portion until the pointer aligns with a marking of the plurality of markings.

20. The method of claim 18, further comprising:

engaging the first body portion and the ring with a translational position tool, wherein the translational position tool comprises at least a handle and a slidable plunger, wherein the handle defines a cavity that receives the plunger; and determining a translational position of at least the first body portion based at least on the position of the plunger and the alignment of the pointer.

* * * * *